United States Patent
Mrozek et al.

(10) Patent No.: US 6,707,863 B1
(45) Date of Patent: Mar. 16, 2004

(54) BASEBAND SIGNAL CARRIER RECOVERY OF A SUPPRESSED CARRIER MODULATION SIGNAL

(75) Inventors: Eric M. Mrozek, Gardena, CA (US); Craig A. Hornbuckle, Torrance, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/305,139

(22) Filed: May 4, 1999

(51) Int. Cl.$^7$ ................................................ H03D 3/24
(52) U.S. Cl. ........................ 375/327; 375/326; 375/373; 329/308
(58) Field of Search ................................ 375/324, 325, 326, 327, 340, 344, 354, 371, 373, 374, 375, 376; 329/300, 302, 304, 307, 308, 325, 360, 363; 327/141, 145, 146, 147, 152, 156; 455/182.1, 182.2, 192.1, 192.2, 202, 205, 214, 255, 265; 331/1 A, 1 R, 18, 25, 4

(56) References Cited

U.S. PATENT DOCUMENTS

| | | | | |
|---|---|---|---|---|
| 3,828,138 A | | 8/1974 | Fletcher et al. | 455/265 |
| 3,835,404 A | | 9/1974 | Nakamura et al. | 375/326 |
| 3,974,449 A | | 8/1976 | Falconer | 375/233 |
| 4,092,606 A | * | 5/1978 | Ryan | 329/308 |
| 4,253,189 A | | 2/1981 | Lemoussu et al. | 375/320 |
| 4,336,500 A | * | 6/1982 | Attwood | 329/308 |
| 4,344,178 A | * | 8/1982 | Waters | 375/327 |
| 4,475,218 A | | 10/1984 | Takeda et al. | 375/327 |
| 4,587,498 A | | 5/1986 | Bonnerot et al. | 375/344 |
| 4,726,043 A | | 2/1988 | Levesque | 375/343 |
| 4,795,986 A | * | 1/1989 | Ceroni et al. | 329/304 |
| 4,807,254 A | | 2/1989 | Otani | 375/327 |
| 4,856,637 A | | 8/1989 | Gebhart | 192/105 C |
| 4,859,956 A | | 8/1989 | Mizoguchi | 329/304 |
| 4,870,382 A | * | 9/1989 | Keate et al. | 331/4 |
| 5,001,727 A | | 3/1991 | McDavid | 375/326 |
| 5,121,071 A | * | 6/1992 | Kelly et al. | 329/307 |
| 5,202,902 A | | 4/1993 | Isard et al. | 375/344 |
| 5,271,041 A | | 12/1993 | Montreuil | 375/344 |
| 5,311,546 A | | 5/1994 | Paik et al. | 375/232 |
| 5,471,508 A | | 11/1995 | Koslov | 375/344 |
| 5,485,489 A | | 1/1996 | Chiba | 375/344 |
| 5,487,186 A | | 1/1996 | Scarpa | 455/192.2 |
| 5,490,176 A | | 2/1996 | Peltier | 375/325 |
| 5,504,785 A | | 4/1996 | Becker et al. | 375/344 |
| 5,519,356 A | | 5/1996 | Greenberg | 329/304 |
| 5,544,200 A | | 8/1996 | An | 375/344 |
| 5,568,521 A | | 10/1996 | Williams et al. | 375/344 |
| 5,572,553 A | | 11/1996 | Kimiavi et al. | 375/344 |
| 5,579,338 A | | 11/1996 | Kojima | 375/149 |
| 5,692,014 A | * | 11/1997 | Basham et al. | 375/326 |
| 5,699,385 A | | 12/1997 | D'Sylva et al. | 375/344 |
| 5,732,339 A | | 3/1998 | Auvray et al. | 455/192.2 |
| 5,809,088 A | | 9/1998 | Han | 375/344 |
| 5,815,535 A | | 9/1998 | Choi et al. | 375/344 |
| 5,844,948 A | | 12/1998 | Ben-Efraim et al. | 375/344 |

* cited by examiner

*Primary Examiner*—Chieh M. Fan
(74) *Attorney, Agent, or Firm*—Harness, Dickey & Pierce, P.L.C.

(57) ABSTRACT

A multidetector (40) circuit for use in a plurality of carrier recovery systems (10, 70) for recovery for a suppressed carrier modulated signal. The multidetector (40) receives demodulated, in-phase x and quadrature phase y components of a baseband signal ($s_n(t)$) and generates output signals for use in a plurality of carrier recovery systems (10, 70). The multidetector (40) generates a lock detection signal that varies primarily in accordance with a lock signal $x^2y^2$ and a fourth-order amplitude detection signal $(x^2+y^2)^2$ for use in either system. The multidetector particularly generates a phase error signal $xy(x^2-y^2)$ for use in a Costas carrier recovery system (10). The multidetector also generates a second-order amplitude detection signal $(x^2+y^2)$ for use in either system which can be used to adjust the amplitude of the incoming, modulated signal in order to control the loop gain of the carrier recovery phase locked loop.

15 Claims, 4 Drawing Sheets

BASEBAND SIGNAL CARRIER RECOVERY OF A SUPPRESSED CARRIER MODULATION SIGNAL

BACKGROUND OF THE INVENTION

1. Field of the Invention

This invention relates to a method and apparatus for baseband signal carrier recovery of a suppressed carrier modulation signal and, more particularly, to a multidetector which receives baseband inputs based on the modulated signal and generates outputs for use by multiple carrier recovery systems.

2. Discussion

In the operation of communication systems, a message signal modulates a carrier signal in order to encode the message information into the modulated signal. The modulated signal is transmitted to a receiver which demodulates the signal, separating the message signal from the carrier signal. Key operations in practical receivers are automatic gain control (AGC), carrier phase tracking, sweep-aided carrier acquisition, and lock detection.

One modulation format that is commonly used in communication systems is quadrature amplitude modulation (QAM). In the QAM format two message signals amplitude-modulate a pair of quadrature carrier signals, i.e., two sinusoids having the same frequency and a phase angle difference of 90 degrees. Examples of QAM special cases are binary phase shift keying (BPSK), quadrature phase shift keying (QPSK), 8 phase shift keying (8 PSK), and rectangular 16-state QAM (16QAM).

The modulation format of the transmitted signal is commonly designed to achieve suppression of the residual carrier. This reduces the energy required to transmit the message with the same fidelity. Carrier suppression can be achieved by symmetrically arranging the phase and amplitude relationships of QAM modulation states, and encoding the data so that each of the modulation states are statistically equally likely.

The extended Costas loop and the remodulation loop are two commonly used circuits for carrier phase tracking of suppressed carrier modulated signals. The addition of amplitude detection circuitry for use in AGC and lock detection circuitry for use in sweep-aided carrier acquisition complicates the design of the receiver, especially when these circuits are implemented in such a way that they process the modulated carrier directly.

It is an object of the present invention to provide a method of using the demodulated low frequency in-phase and quadrature-phase baseband signals to derive the amplitude detection and lock detection signals in addition to the phase error signal.

It is a further object of the present invention to provide a circuit that implements the method of using the demodulated baseband signals to derive the amplitude detection, lock detection, and phase error signals, and combines common elements to reduce the complexity of the circuit.

SUMMARY OF THE INVENTION

This invention is directed to a circuit for recovering a carrier of a suppressed carrier modulated signal having a high frequency. The circuit includes an in-phase and quadrature-phase detector, wherein the detector converts the incoming signal to a baseband signal having a frequency less than the modulated signal. A multidetector receives the baseband signal output by the detector. The multidetector operates on the lower frequency baseband signal and generates a plurality of output signals. The plurality of output signals determine an error signal which varies in accordance with a phase error between a desired carrier and a received carrier signal. A phase-lock-loop detector receives the error signal and generates a lock signal input to the detector to vary the phase of the detector.

This invention is also directed to a method of recovering a carrier of a suppressed carrier modulated signal having a high frequency. The method includes the steps of demodulating the modulated signal into a baseband signal having in-phase and quadrature-phase components, where the in-phase and quadrature-phase components have a frequency less than that of the modulated signal. The method also includes the step of generating a plurality of output signals in accordance with the baseband signal and generating an output error signal in accordance with at least one of the plurality of output signals. The output error signal defines a phase error between a desired carrier signal and a received carrier signal. The method also includes varying the output of a phase lock loop in accordance with the error signal and controlling the demodulation of the modulated signal in accordance with the output of the phase lock loop in order to lock onto the carrier signal.

These and other advantages and features of the present invention will become readily apparent from the following detailed description, claims and drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE INVENTION

Figure 1:
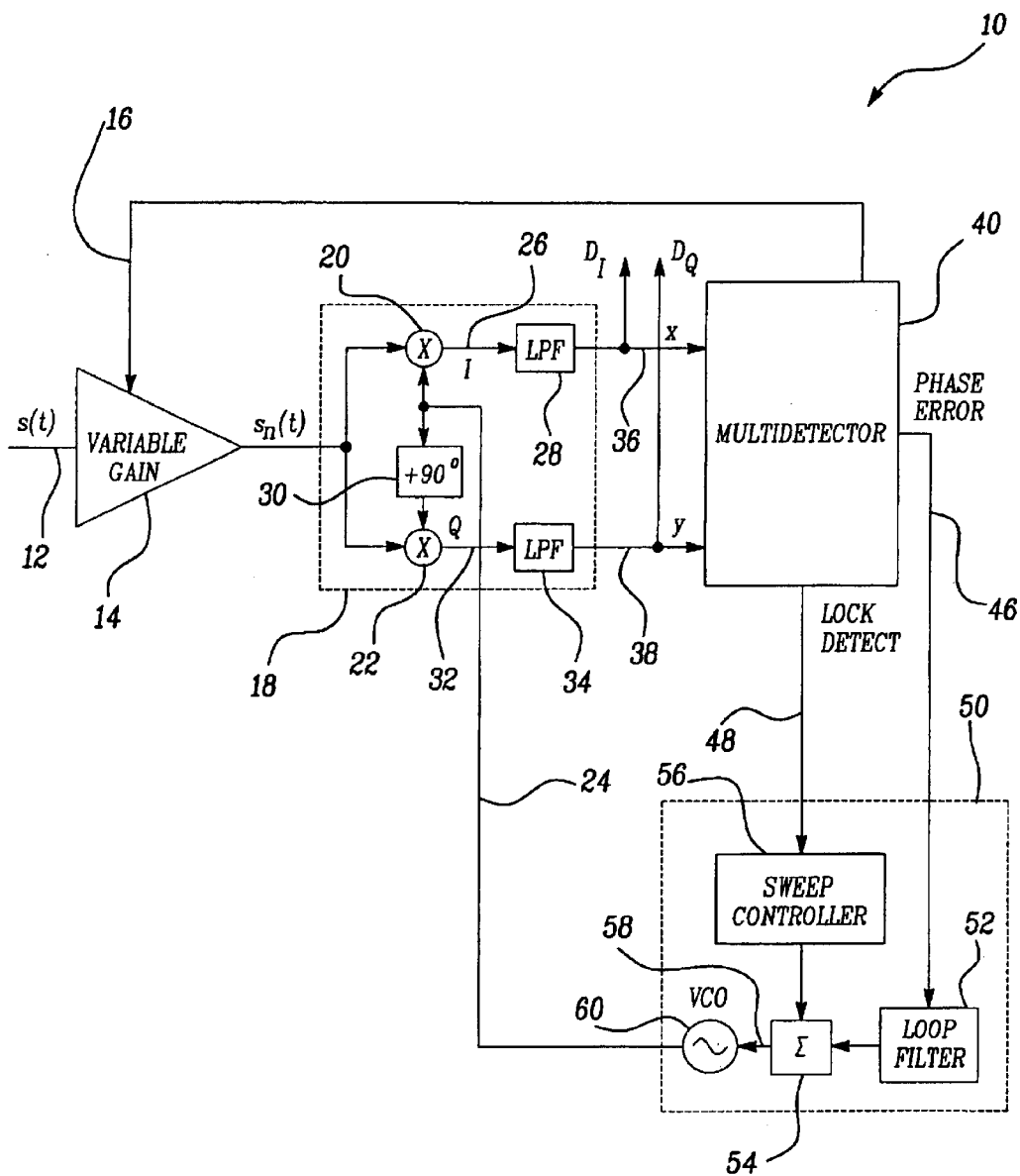
FIG. 1 is a block diagram of the baseband signal carrier recovery apparatus arranged in accordance with the principles of a first embodiment of the present invention.

FIG. 1 depicts a carrier recovery system 10 utilizing an extended Costas loop for recovering the carrier signal. The carrier recovery system 10 receives a modulated signal s(t), such as described above, which is input on an input line 12 to a variable gain amplifier 14. Variable gain amplifier 14 receives a gain control signal on input line 16. Generation of the gain control signal will be described in greater detail herein. Variable gain amplifier 14 outputs a peak amplitude normalized signal $s_n(t)$ which is the input signal s(t) amplified by variable gain amplifier 14. The normalized signal $s_n(t)$ is input to a demodulator 18.

Demodulator 18 decomposes signal $s_n(t)$ into the respective in-phase and quadrature-phase baseband components. Particularly, input signal of $s_n(t)$ is input to each of a pair of mixers 20, 22. Mixer 20 also receives a recovered carrier from phase lock loop (PLL) 50 on line 24. Mixer 20 effects a multiplication of amplified input signal $s_n(t)$ and the recovered carrier signal to output the in-phase component I of amplified signal $s_n(t)$ on in-phase line 26. The in-phase component is input to low pass filter 28. The recovered carrier signal is also input to a phase shifter 30. Phase shifter 30 shifts the recovered carrier signal by 90°. The output from phase shifter 30 provides a second input to mixer 22. Mixer 22 thus effects a multiplication of amplified input signal of $s_n(t)$ and the recovered carrier signal shifted by 90°. Mixer 22 outputs a quadrature-phase component Q of the amplified input signal $s_n(t)$ on quadrature-phase line 32. Similarly as for the in-phase component, the quadrature-phase component is input to low pass filter 34. Low pass filters 28, 34 output the low frequency portions of the respective in-phase and quadrature-phase components I & Q of the input signal $s_n(t)$ to output the in-phase component $D_I$ of the baseband signal and the quadrature-phase component $D_Q$ of the baseband signal. These baseband signals are output by low pass filters 28, 34 on the respective in-phase baseband line 36 and quadrature-phase baseband line 38 which are also input to multidetector 40. The in-phase component $D_I$ of the baseband signal will also be referred to as x with respect to input to multidetector 40. Similarly, the quadrature-phase component $D_Q$ of the baseband signal will be referred to as y for input to the multidetector.

Multidetector 40 receives the respective input signals x, y and outputs several signals for recovering the baseband signal. For example, multidetector 40 outputs an amplitude signal on output line 17 and input to the AGC loop filter 15. Multidetector 40 also outputs a phase error signal on output line 46 and a lock detection signal on output line 48. As described above, the amplitude signal is input to AGC loop filter 15, which processes the amplitude signal to generate a gain control signal which is output to variable gain amplifier 14 on input line 16 in order to vary the gain of amplifier 14. The level adjustment of input signal s(t) to yield $s_n(t)$ insures proper operation of the phase lock loop (PLL) circuit which generates the recovered carrier signal on line 24.

The phase error and lock detect signals are input to carrier PLL circuit 50. The phase error signal is input to a loop filter 52 which filters the phase error signal and outputs a filtered phase error signal to summer 54. The lock detect signal is input to a sweep controller 56 by multidetector 40. If the lock detect signal indicates that no lock has been obtained, sweep controller 56 generates a triangular wave output signal to summer 54 to enable carrier PLL circuit 50 to sweep a range of frequencies in order to allow carrier PLL circuit 50 to obtain lock. If the lock detect signal indicates that lock has been obtained by carrier PLL circuit 50, sweep controller 56 stops sweeping. The output of sweep controller 56 and loop filter 52 is input to summer 54. Summer 54 generates an input signal to voltage controlled oscillator (VCO) 60 on input line 58. VCO 60 outputs the PLL signal on PLL line 24 in accordance with the output signal from summer 54.

Figure 2:
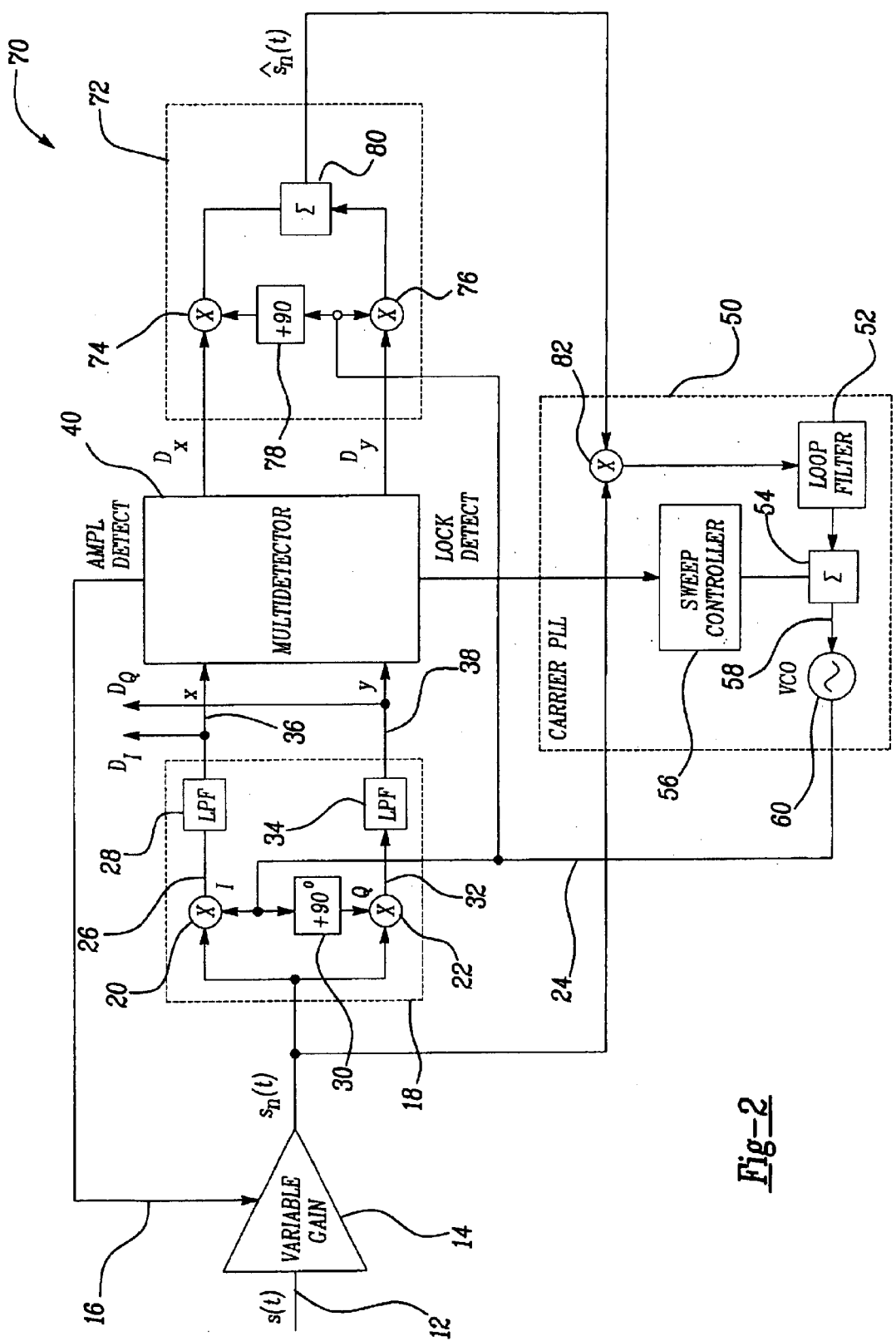
FIG. 2 is a block diagram of the baseband signal carrier recovery system arranged in accordance with the principles of the second embodiment of the present invention.

FIG. 2 depicts a carrier recovery system 70 arranged in accordance with the principles of the second embodiment of the present invention. In FIG. 2, like elements from FIG. 1 will be referred to using similar reference numerals. Accordingly, variable gain amplifier 14, demodulator 18, and multidetector 40, operate as described with respect to FIG. 1. However, rather than utilizing an extended Costas loop, the carrier recovery system 70 of FIG. 2 utilizes a remodulation loop for recovering the carrier signal.

In addition to the operations as described above with respect to FIG. 1, multidetector 40 also generates $D_x$ and $D_y$, estimates of the in-phase and quadrature-phase components of the baseband signal. The respective in-phase $D_x$ and quadrature-phase $D_y$ components of the baseband signal are input to remodulator 72. In addition to receiving the respective in-phase and quadrature-phase components of the baseband signal, remodulator 72 also receives the recovered carrier signal from PLL line 24. Remodulator 72 effectively reconstructs the input signal $s_n(t)$, and carrier PLL circuit 50 utilizes the reconstructed signal, referred to as $\hat{s}_n(t)$, for generating the phase error signal that is input to the loop filter 52.

Remodulator 72 includes a pair of mixers 74, 76. Mixer 74 receives the in-phase component $D_x$ of the baseband signal. Mixer 74 also receives the PLL signal from PLL line 24 phase shifted 90° by phase shifter 78. Mixer 74 thus outputs a reconstructed version of the in-phase component of $s_n(t)$. Similarly, mixer 76 receives the quadrature-phase component $D_y$ of the baseband signal. Mixer 76 also receives the PLL signal output on PLL line 24. Mixer 76 thus outputs a reconstructed version of the quadrature-phase portion of $s_n(t)$. The in-phase and quadrature-phase components output by respective mixers 74, 76 are input to summer 80. Summer 80 adds the respective components and outputs a reconstructed version $\hat{s}_n(t)$ of the modulated input signal $s_n(t)$.

The reconstructed signal $\hat{s}_n(t)$ is input to a mixer 82 of carrier PLL circuit 50. Mixer 82 also receives the amplitude adjusted modulated signal $s_n(t)$. Mixer 82 operates as a phase detector and outputs a phase error signal to loop filter 52. Loop filter 52, sweep controller 56, summer 54, and VCO 60 of carrier PLL circuit 50 operate as described with respect to FIG. 1, utilizing the phase error output by mixer 82 rather than the phase error output by multidetector 40 of FIG. 1.

Figure 3:
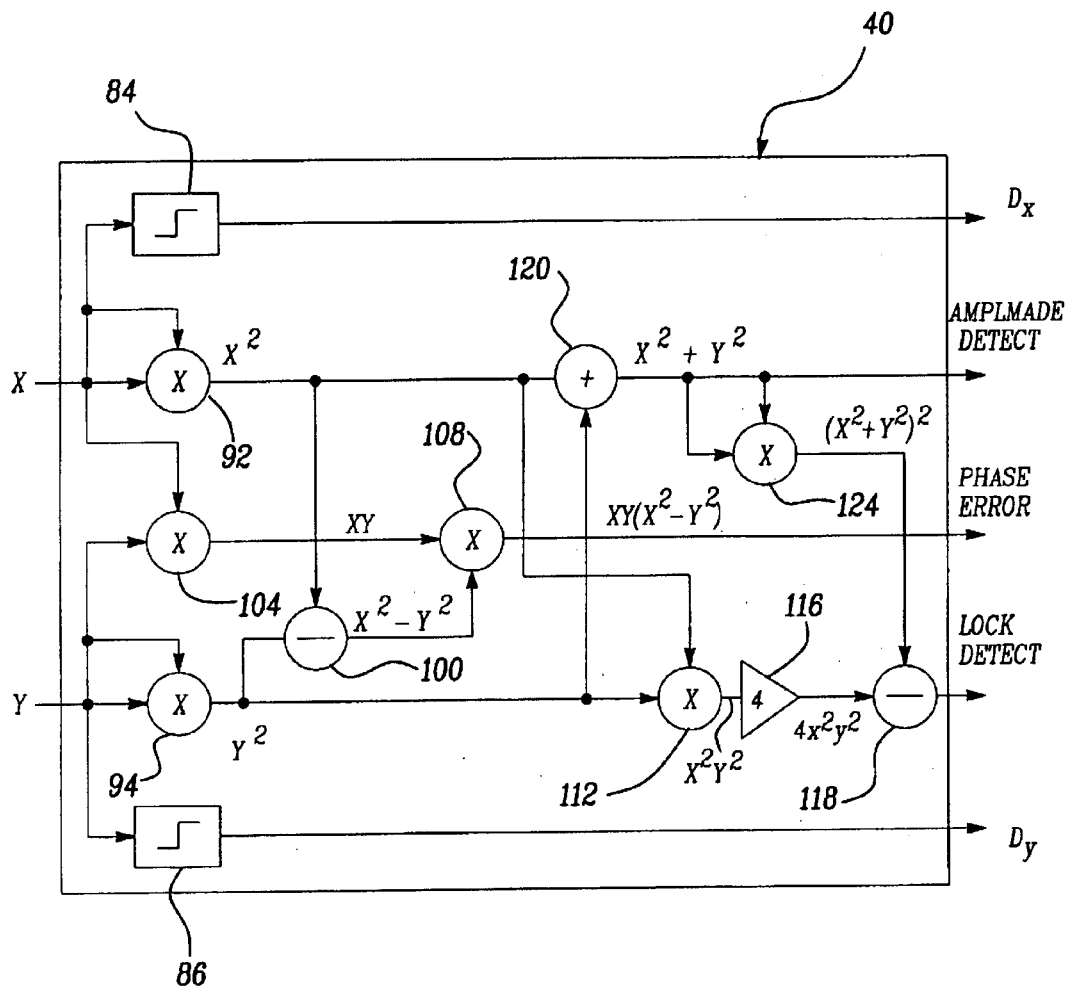
FIG. 3 is a block diagram of the multidetector of FIGS. 1 and 2.
Figure 4:
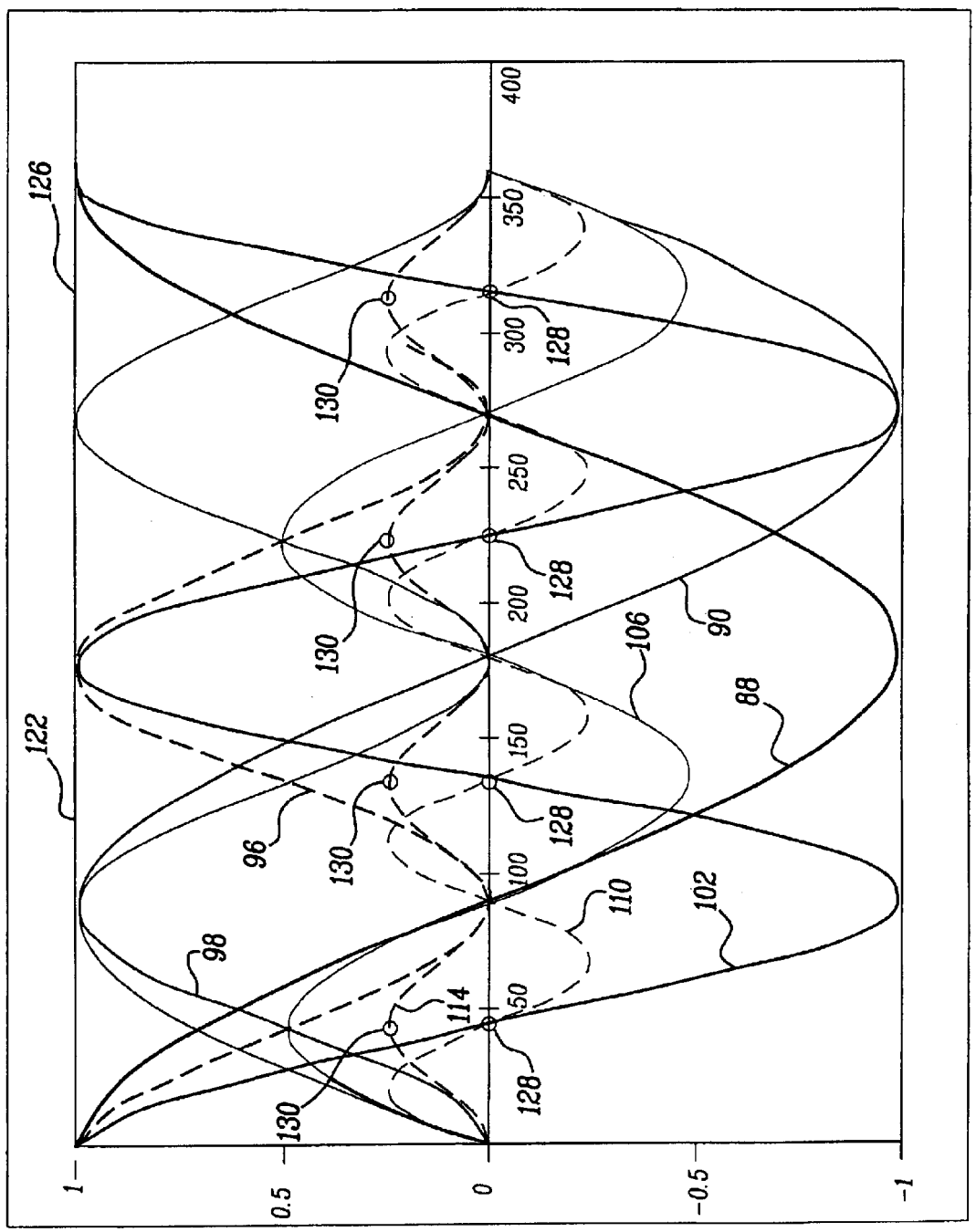
FIG. 4 is a graph of signal waveforms generated by the multidetector of FIG. 3.

FIG. 3 depicts an expanded block diagram of multidetector 40, and FIG. 4 displays waveform signal levels versus phase for signals generated by multidetector 40. The inputs to multidetector 40 are as described with respect to FIGS. 1 and 2. Namely, input x corresponds to the in-phase component of the baseband signal and input y corresponds to the quadrature-phase component of the baseband signal. Referring to FIG. 2, remodulator 72 utilizes the in-phase component $D_x$ and the quadrature-phase component $D_y$ of the baseband signal in order to reconstruct the modulated signal $\hat{s}_n(t)$. As shown in FIG. 3, the in-phase component x is input to a hard limiter 84 which outputs a first value if x is greater than a threshold and second value if x is less than a threshold. For example, hard limiter 84 may output a+1 when x is greater than 0 and a−1 when x is less than 0. Similarly, the quadrature-phase component y is limited by hard limiter 86 which outputs signal $D_Y$ in a manner similar to hard limiter 84. Thus, multidetector 40 outputs signals for use by a remodulation system for baseband signal carrier recovery.

Multidetector 40 also generates several other signals for utilization for baseband signal recovery of a suppressed carrier modulation signal. In particular, multidetector 40 generates an amplitude detection signal and a lock detection signal which are utilized by the respective variable gain amplifier 14 and carrier PLL circuit 50 of both FIGS. 1 and 2. Multidetector 40 also generates a phase error signal which is utilized by carrier PLL circuit 50 in the system of FIG. 1.

FIG. 4 depicts exemplary waveforms for each of the signals output by multidetector 40. In particular, waveform 88 corresponds to input signal x, and waveform 90 corresponds to input signal y. Additional signals of waveforms shown in FIG. 4 will be referred to as their construction is described with respect to FIG. 3. In particular, the in-phase input signal x is split, and each of the split signal is input to mixer 92 to output the signal $x^2$. Similarly, the quadrature-phase signal input y is split, and each split signals input to mixer 94 to generate the signal $y^2$. In FIG. 4, waveform 96 represents the $x^2$ signal and waveform 98 represents the $y^2$ signal. The respective $x^2$ and $y^2$ signals are input to subtractor 100 which outputs an $x^2-y^2$ signal, which is represented in FIG. 4 as waveform 102. The x and y signals are also input to mixer 104 which generates the output signal xy, represented in FIG. 4 as waveform 106. The output from mixer 104 is input to mixer 108. The $(x^2-y^2)$ signal is also input to mixer 108 to output a signal $xy(x^2-y^2)$, represented as waveform 110 in FIG. 4. Waveform 110 represents the phase error output by multidetector 40, which is used by carrier PLL circuit 50 of FIG. 1.

The signals $x^2$ and $y^2$ are also each input to mixer 112, and the output from mixer 112 represents a signal $x^2y^2$, represented in FIG. 4 as waveform 114. The $x^2y^2$ signal is referred to as the lock signal, as PLL lock primarily depends upon this signal. The signal $x^2y^2$ is input to amplifier 116 which has a gain k which is slightly greater than four. The value of k determines the phase range for which the lock detection signal indicates lock. The choice of the value of k will be discussed later. The output from amplifier 116 is a signal $kx^2y^2$. This signal is input to subtractor 118 along with the signal $(x^2+y^2)^2$. Subtractor 118 generates the lock detect signal as will be described further herein.

The amplitude detection signal is formed by adding the $x^2$ signal and $y^2$ signal by applying both signals to adder 120 which outputs the signal $x^2+y^2$, which is represented in FIG. 4 as waveform 122. This output represents the amplitude detection signal. The output signal from adder 120 is split, and each split signal is input to mixer 124 which outputs a signal $(x^2+y^2)^2$, which is referred to as the amplitude reference signal. This signal is represented in FIG. 4 as waveform 126. It will be noted by one skilled in the art that because signals x and y vary between 1 and −1, $x^2+y^2$ is equal to $(x^2+y^2)^2$. The output from mixer 124 provides a second input to subtractor 118, and subtractor 118 outputs a signal $kx^2y^2-(x^2+y^2)^2$. When the value of k is slightly greater than 4, there is a small phase range about the ideal lock points for which the lock detection signal is greater than zero. At other phases the lock detection signal is less than or equal to zero. Thus the sign of the lock detection signal on line 48 is used by the sweep controller 56 to turn the sweeping of the VCO on and off. This value is output as the lock detect signal which is input to sweep controller 56 of carrier PLL circuit 50 in each of FIGS. 1 and 2. The lock detect signal primarily depends on $x^2y^2$. The value $x^2y^2$ may be processed as occurs at amplifier 116 and summer 118, but need not necessarily be processed as described herein.

With particular reference to FIG. 4, waveform 110 represents the phase error output signal $xy(x^2-y^2)$ and waveform 114 represents the lock signal $x^2y^2$. When waveform 110 crosses the horizontal axis, carrier PLL circuit 50 has either obtained lock or is farthest away from a lock condition. Carrier PLL circuit 50 is locked when waveform 114 is at a maximum. Conversely, carrier PLL circuit 50 is furthest from a locked condition when waveform 110 crosses the horizontal axis and when waveform 114 is at a minimum value. Thus, as can be seen from FIG. 4, carrier PLL circuit 50 is in lock during negative going crossings of the horizontal axis by waveform 110 as shown at data points 128. Or, stated differently, carrier PLL circuit 50 is locked when waveform 114 is at a maximum, as shown at data points 130.

From the foregoing, it can be seen that the multidetector 40 of the present invention provides output signals for utilization by either a Costas format or remodulation format baseband carrier recovery of a suppressed carrier modulated signal system. Thus, the multidetector 40 enables great flexibility in designing systems and provides output for use by either format while economizing on circuitry to generate the output signals for either baseband signal carrier recovery system.

While specific embodiments have been shown and described in detail to illustrate the principles of the present invention, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed:

1. An apparatus for recovering a carrier of an incoming suppressed carrier modulated signal having a high frequency comprising:

an in-phase and quadrature-phase detector, the detector converting the incoming modulated signal to a baseband signal having a frequency less than the incoming modulated signal;

a multidetector for receiving the baseband signal output by the detector, the multidetector operating on the lower frequency baseband signal and generating a plurality of output signals, where a first set of the plurality of output signals providing a Costas demodulation application, including a phase error signal which varies in accordance with a phase error between a desired carrier and a received carrier signal, and a second set of the plurality of output signals providing a remodulation demodulation application and;

a phase-lock-loop detector receiving the phase error signal and generating a lock signal input to the in-phase and quadrature-phase detector to vary a phase of the in-phase and quadrature-phase detector.

2. The apparatus of claim 1 wherein said second set of the plurality of output signals comprises an in-phase signal and a quadrature-phase signal.

3. The apparatus of claim 1 further comprising a remodulator, the remodulator receiving said second set of the plurality of output signals and generating a reconstructed signal.

4. The apparatus of claim 1 wherein the in-phase and quadrature-phase detector further comprises a first low pass filter for filtering an in-phase portion of a demodulated signal and a second low pass filter for filtering a quadrature-phase portion of the demodulated signal.

5. The apparatus of claim 1 wherein an in-phase signal, and an quadrature-phase signal are used in the remodulation demodulation application.

6. The apparatus of claim 5 wherein the in-phase signal is hard limited and the quadrature-phase signal is hard limited.

7. The apparatus of claim 5 wherein the multidetector generates a lock detect signal, and the respective signals are defined as follows:

an in-phase component of the baseband signal x, a quadrature component of the baseband signal y;

the phase error signal $xy(x^2-y^2)$; and wherein the lock detect signal varies in accordance with a signal defined as $x^2y^2$.

8. The apparatus of claim 7 wherein the multidetector further generates an amplitude detection signal defined as $x^2+y^2$.

9. The apparatus of claim 8 wherein the amplitude detection signal is input to an amplifier to adjust a level of the incoming modulated signal.

10. The apparatus of claim 8 wherein the second set of the plurality of output signals includes the in-phase signal and the quadrature-phase signal, such that the in-phase signal is hard limited and the quadrature-phase signal is hard limited.

11. A method of recovering a carrier of a suppressed carrier modulated signal having a frequency comprising the steps of:

demodulating the modulated signal into a baseband signal having in-phase and quadrature-phase components, where the in-phase and quadrature-phase components have a frequency less than that of the modulated signal;

generating a plurality of output signals in accordance with the baseband signal;

generating an output error signal in accordance with at least one of the plurality of output signals, the output error signal defining a phase error between a desired carrier signal and a received carrier signal;

varying the output of a phase lock loop in accordance with the error signal; and controlling the demodulating of the modulated signal in accordance with the output of the phase lock loop in order to lock onto the carrier signal;

and wherein the step of generating a plurality of output signals further comprises generating one set of signals for enabling a Costas demodulating application and generating another set of signals for providing a remodulation demodulating application.

12. The method of claim 11 wherein the step of demodulating the modulated signal further comprises the step of filtering the in-phase and quadrature-phase components to eliminate frequencies above a predetermined threshold.

13. The method of claim 11 wherein the in-phase component is defined as x and the quadrature phase component is defined as y and the step of generating a plurality of output signals further comprises the steps:

generating a lock detect signal that varies in accordance with a lock signal defined as $4x^2y^2$; and generating a phase error signal defined as $xy(x^2-y^2)$.

14. The method of claim 13 further comprising utilizing the lock detect and phase error signals to vary the output of the phase lock loop.

15. The method of claim 13 further comprising utilizing the lock detect signal, the in-phase component and the quadrature-phase component to vary the output of the phase lock loop.

* * * * *